United States Patent Office 3,605,727
Patented Sept. 20, 1971

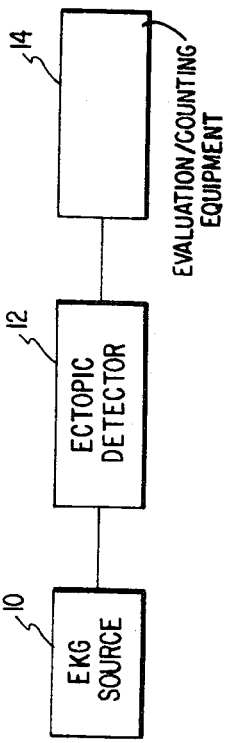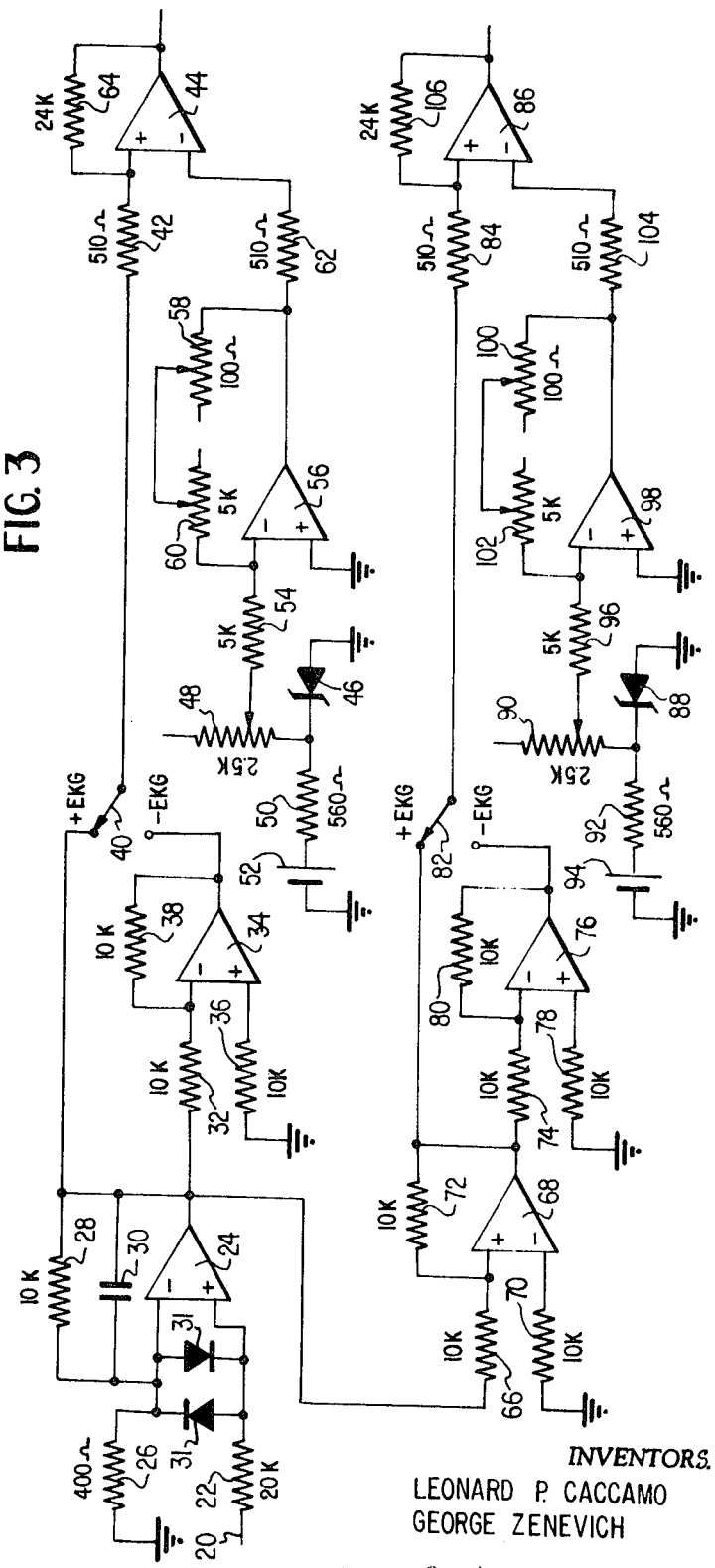

3,605,727
APPARATUS AND METHOD OF MONITORING AND EVALUATING ELECTROCARDIAC TRACES
George Zenevich, 246 Hillcrest Ave., Hubbard, Ohio 44425, and Leonard P. Caccamo, 45 Redfern Drive, Youngstown, Ohio 44505
Filed Sept. 4, 1968, Ser. No. 757,346
Int. Cl. A61b 5/04
U.S. Cl. 128—2.06A
14 Claims

ABSTRACT OF THE DISCLOSURE

An apparatus for and a method of evaluating electrocardiac traces to determine heart conditions. The trace is applied to first and second comparison means which provide respectively first and second output indications when the trace exceeds first and second comparison levels. One comparison level is set, for example, to detect the R wave in each electrocardiac complex within the trace. The other comparison level is set to detect, by way of examples, each ectopic R wave of an abnormally high magnitude, or each P wave, each R wave, and each T wave, or after inversion each Q wave and each S wave. From counts of the numbers of detected waves, various ectopics heart conditions can be determined and evaluated.

---

The present invention relates to an appartaus for and a method of evaluating electrocardiac traces. More particularly, the present invention relates to an apparatus and method by which an electrocardiac trace can be evaluated to determine the number of abnormal pulses within the trace.

A frequently used method of determining the condition of a person's heart is to detect, record and evaluate the electrical impulses generated as heart beats. These electrical signals can be detected by placing electrodes on a patient's skin. When the electrodes are connected to suitable amplifying and recording apparatus, a permanent record of the impulses can be obtained. In many instances these electrocardiac (EKG) signals are graphically recorded to provide an EKG trace on a paper tape. Skilled personnel then visually evaluate the EKG trace to determine the characteristics thereof in an attempt to diagnose the condition of the patient's heart.

Normally, the EKG complex resulting from a heart beat includes a group of pulses or waves. The most prominent of these is a relatively high amplitude positive spike, preceded and followed by low amplitude negative pulses. This grouping is commonly referred to as the QRS complex. Immediately preceding this QRS complex there is normally a small positive pulse referred to as the P wave. Following the QRS complex, there is normally another small positive pulse referred to as the T wave and separated from the QRS complex by a brief reference level interval referred to as the ST segment. Thus, the EKG complex of a normal heart beat commences with the small positive amplitude P wave, followed substantially immediately by a small negative amplitude Q wave, at the termination of which the relatively high amplitude positive R wave commences. This R wave is of a brief duration and is immediately followed by the small negative amplitude S wave. The S wave is followed by the reference level ST segment at the conclusion of which the small positive T wave occurs. In a normal, healthy heart the shape of this EKG complex follows these characteristics, and each segment falls within certain limits.

Numerous heart conditions result in the occasional generation of an abnormal or ectopic heart beat. These ectopic heart beats might be of a variety of different types. Thus, for example, in one type of ectopic heart beat, the R wave is of an extremely greater amplitude than normal. In other types of ectopic heart beats, the P wave or the T wave may be missing. In still other ectopic heart beats the Q wave or the S wave may have an abnormal amplitude, either having a greater amplitude, whereby it is more negative than normal, or having a lesser amplitude, whereby it is less negative than normal or perhaps entirely missing. In general, a heart, even though it may from time to time generate an abnormal pulse, will generate only one type of ectopic heart beat. Thus, for example, if the P wave is occasionally missing, then it is unlikely that the same heart will beat in a manner such that the T wave is also occasionally missing.

Meaningful diagnosis of a heart condition frequently includes analysis of an EKG trace for a substantial period of time, for example, an EKG trace covering 12 to 18 hours. To best determine a patient's heart condition from his EKG trace, it is desirable that the patient be undergoing his usual activities while the trace is made. Thus, portable EKG recorders are utilized which can be attached to the patient to produce a permanent record of his EKG trace as he goes about his normal daily activity. Since a normal heart beats in the order of 60 to 80 times per minute, the resulting record of this for example 18 hour EKG trace is quite lengthy. Visual analysis of it is accordingly a laborious chore, requiring skilled personnel. Even then inaccuracies may occur due to failure to recognize certain deviations from a normal complex. Apparatus have been developed for analyzing EKG traces; however, heretofore automatic EKG analysis equipment has been capable of detecting only one of the several types of ectopic heart beats. Accordingly much equipment has been required to detect all types of ectopic heart beats.

The present invention is an apparatus for and method of evaluating EKG traces by means of which any one of several types of ectopic heart beats can be detected. In accordance with the present invention, the EKG trace, either directly from the patient or from a previously made recording, is applied through an input amplifier which removes the effect of any periodic ambient noise having a frequency in excess of the heart beat rate. The EKG trace output from this amplifier is then applied in a first channel as the first input to a comparator which receives, as its second input, a signal establishing the level above which the EKG trace must rise in order to provide an output indication. The output of the input amplifier is also applied to a unity gain inverting amplifier, the output of which can be alternatively applied to the comparator. The output of the input amplifier is additionally applied to a second channel which includes a second comparator by means of which the EKG trace can be compared with another reference level.

By way of example, one comparator can be adjusted to provide an output for each normal R wave of the EKG trace, while the other comparator is adjusted to provide an output only for waves of an amplitude in excess of the normal R wave amplitude. The apparatus then gives an indication of the total number of heart beats and the total number of ectopic heart beats of the type typified by an R wave of extremely increased amplitude. In another type of evaluation, one comparator can be adjusted to provide an output of a level which detects each normal R wave amplitude while the other comparator provides an output each time the EKG trace rises above the level exceeded by the P wave, the R wave or the T wave. The one channel output is then a count of the total number of heart beats, while the other channel output is a count of the total number of heart beats, while the other channel output is a count of the total number of normal P waves, R waves, and T waves. By this means it is possible to detect the number of ectopic heart beats of the type in which the P wave or the T wave is missing. Since generally only one of these two types of ectopic heart beats is generated by a given patient, this operation can determine the number of that type of ectopic heart beats.

In a third application, the input to one comparator is switched to the inverter output in its channel, and its comparison level is set so that an output is indicated each time the Q wave or the S wave occurs. The other channel comparator is adjusted to provide an output for each normal R wave. Accordingly, this latter channel indicates the total number of heat beats, while the former channel indicates the total number of Q waves and S waves. Thus, if any Q waves or S waves are missing, that condition can be determined. Again, it generally is the case that only ectopic heart beats of one of these two types will occur in a patient, either missing the Q wave or missing the S wave. The present apparatus and method are thus capable of detecting and counting the total number of ectopic heart beats of any of a variety of types.

These and other aspects and advantages of the present invention are apparent in the following detailed description and claims, particularly when considered in conjunction with the accompanying drawings. In the drawings:

FIG. 1 is a representation of a normal EKG complex;
FIG. 2 is a block diagram of the present invention;
FIG. 3 is a schematic diagram of the ectopic detector utilized in the present invention.

As depicted in FIG. 1, the EKG complex of a normal heart beat commences with a relatively low amplitude positive pulse commonly referred to as the P wave. This pulse is followed by a relatively low amplitude negative pulse known as the Q wave. The Q wave is immediately followed by a relatively high amplitude fast-rising spike pulse, known as the R wave, which substantially immediately drops off and is followed by the negative S wave having an amplitude perhaps slightly more negative than the Q wave. The S wave is followed by a brief reference level period known as the ST interval after which the low amplitude positive T wave occurs. After a short reference level period, the next heart beat occurs, and its EKG complex commences with another P wave.

An EKG trace comprising EKG complex signals of the type shown in FIG. 1 is applied from EKG source 10, depicted in FIG. 2, to ectopic detector 12 which detects the ectopic heart beats recorded in the EKG trace. The output of ectopic detector 12 can be applied to suitable evaluation equipment 14 which, for example, might comprise counting equipment capable of indicating the total number of heat beats occurring and the total number of ectopic heart beats. Additionally, evaluation equipment 14 could, if desired, include other equipment, for example, equipment indicating the number of ectopic heart beats as a percentage of total number of heart beats.

EKG source 10 might comprise a patient to whom electrodes are attached to detect the EKG trace as his heart beats occur. However, in the evaluation of heart activity over a long period of time such as 18 hours, it is impractical to apply the EKG trace directly from the patient to the ectopic detector. In such a situation, the EKG trace might be recorded on, for example, magnetic tape while the patient goes about his regular activities. The resulting recording is later played back and applied to the ectopic detector. The playback of the recording can be at an increased speed, thereby shortening the evaluation process. Thus, for example, if the playback is at a speed 60 times faster than the recording speed, a trace of 18 hours of EKG signals can be processed through the ectopic detector in 18 minutes.

The EKG trace is applied to input line 20 in FIG. 3 which is coupled through resistor 22 to the positive or non-inverting input of operational amplifier 24. The negative or inverting input of operational amplifier 24 is coupled to ground through resistor 26. The output of amplifier 24 is coupled through a parallel feedback combination of resistor 28 and capacitor 30 to its negative input. If desired, means such as diodes 31 can be coupled across the inputs of amplifier 24 to prevent damage to the amplifier in the event a high amplitude voltage spike should be applied to the input.

Resistor 22, which may represent source impedance in the output of EKG source 10, has a magnitude in the order of 20,000 ohms. Resistor 28 has a magnitude in the order of 10,000 ohms, while the magnitude of resistor 26 is determined by the gain which it is desired to obtain from amplifier 24. Thus, for example, if a gain of 25 is desired, then resistor 26 has a magnitude of 400 ohms. If the EKG trace applied to input line 20 is obtained from the high speed playback of a recorded EKG trace such as a recording played back at a speed 60 times as fast as the recording speed, then capacitor 30 has a magnitude in the order of 0.05 µf. If, however, the EKG signal applied to input line 20 is a real time signal, for example obtained directly from the patient, then capacitor 20 has a magnitude in the order of 3.0 µf.

The feedback caused by the parallel combination of resistor 28 and capacitor 30 causes attenuation of signals having a frequency higher than about five times the normal heart beat rate. Thus, for example, if the input applied to amplifier 24 is a real time trace of about 80 heart beats per minute, then the P wave, the R wave and the T wave in each EKG complex cause the input to appear as a source of pulses having a frequency in the order of 4 hertz. The parallel combination of the 10,000 ohm resistor 28 and the 3.0 µf. capacitor 30 attenuates signals having frequencies greater than this normal heart beat rate; for example, signals in excess of 6 hertz are somewhat attenuated, and signals of a frequency higher than about five times the normal heart beat rate, i.e. above about 20 hertz, are considerably attenuated. Therefore, amplifier 24 with its input and feedback circuitry attenuates any 60-cycle noise picked up from nearby 60-cycle sources and included in the input on line 20. Accordingly, the output of amplifier 24 is a substantial noise-free EKG trace. Likewise, if the input is a recorded EGK trace played back at a speed 60 times faster than the recording speed, the feedback combination of a 10,000 ohm resistor 28 and a 0.05 µf. capacitor 30 attenuates the 3600 hertz resulting from recorded 60 hertz noise.

The output of amplifier 24 is coupled through resistor 32 to the inverting input of operational amplifier 34. The positive input of amplifier 34 is coupled to ground through resistor 36. Feedback resistor 38 couples the output of amplifier 34 to its inverting input. Resistors 32, 36, and 38 are of the same value, for example, 10,000 ohms, and so amplifier 34 functions as a unity gain inverter.

Single-pole-double-throw switch 40 has its first fixed terminal connected to the output of amplifier 24, its second fixed terminal connected to the output of amplifier 34, and its movable terminal coupled through resistor 42 to the positive input of comparison amplifier or comparer 44.

Zener diode 46 has its anode tied to ground and its cathode tied to the fixed terminal of rheostat 48. The junction of the Zener diode 46 and rheostat 48 is coupled through resistor 50 to the positive terminal of direct voltage source 52 which has its negative terminal tied to ground. The sliding terminal of rheostat 48 is coupled by resistor 54 to the negative input of operational amplifier 56. The positive input of amplifier 56 is tied to ground. The output of amplifier 56 is connected to the fixed terminal of rheostat 58 which has its sliding terminal tied to the sliding terminal of rheostat 60. The fixed terminal of rheostat 60 is tied to the negative input of amplifier 56. The output of amplifier 56 is coupled through resistor 62 to the negative input of comparer 44. Feedback resistor 64 couples the output of comparer 44 to its positive input.

Comparer 44 thus provides an output indication when the EKG trace applied to its positive input exceeds the level of the signal applied to its negative input. This comparison level is determined by the adjustment of rheostats 48, 58, and 60.

Input amplifier 24 also has its output coupled through resistor 66 to the non-inverting or positive input of operational amplifier 68. Resistor 70 couples the negative input of amplifier 68 to ground, while feedback resistor 72 couples the output of amplifier 68 to its positive input. The output of amplifier 68 is coupled through resistor 74 to the inverting or negative input of operational amplifier 76 which has its positive input coupled to ground through resistor 78 and its output coupled to its negative input by feedback resistor 80. Resistors 66, 70, 72, 74, 78 and 80 are preferably all of the same value, for example 10,000 ohms, and accordingly both amplifier 68 and amplifier 76 have unity gain. Since the EKG trace is applied to the positive input of amplifier 68, no inversion takes place in that amplifier, and it acts as a buffer or isolation amplifier. The EKG trace is applied to the negative input of amplifier 76 which, accordingly, acts as an inverter.

Single-pole-double-throw switch 82 has its first fixed contact tied to the output of amplifier 68, its second fixed contact tied to the output of amplifier 76 and its movable contact coupled through resistor 84 to the positive input of comparison amplifier or comparer 86. Zener diode 88 has its anode tied to ground and its cathode tied to the fixed terminal of rheostat 90. The cathode of Zener diode 88 is also coupled through resistor 92 to the positive terminal of direct voltage source 94, the negative terminal of which is tied to ground. The movable contact of rheostat 90 is coupled by resistor 96 to the negative input of operational amplifier 98 which has its positive input tied to ground. The output of amplifier 98 is tied to the fixed terminal of rheostat 100, which has its sliding terminal tied to the sliding terminal of rheostat 102. The fixed terminal of rheostat 102 is connected to the negative input of amplifier 98.

The output of amplifier 98 is coupled through resistor 104 to the negative input of comparer 86. Feedback resistor 106 couples the output of comparer 86 to its positive input. Comparer 86 provides an output indication when the EKG trace applied to its positive input exceeds the comparison signal applied to its negative input. That comparison signal is determined by the adjustment of rheostats 90, 100, and 102.

If it is desired to operate the ectopic detector to detect ectopic heart beats of the type in which the R wave is of an extremely increased amplitude, then both switch 40 and switch 82 are turned to their first positions to cause the non-inverted EKG trace to be applied to both comparer 44 and comparer 86. Rheostats 48, 58, and 60 are adjusted so that comparer 44 provides an output indication when the EKG trace exceeds a level considerably greater than the maximum amplitude of a normal R wave. Thus, for example, where a normal R wave might provide an output voltage from input amplifier 24 in the order of 2500 millivolts (mv.), then rheostats 48, 58, and 60 might be adjusted to cause an output indication from comparer 44 when its EKG trace input exceeds 2500 mv. Rheostats 90, 100, and 102 are adjusted so that comparer 86 provides an output indication when the EKG trace exceeds a level greater than the P wave or the T wave but less than the R wave amplitude. Accordingly, comparer 86 provides an output indication for each heart beat recorded in the EKG trace. Since comparer 44 only provides an output indication when an EKG signal exceeds a level substantially greater than the normal R wave level, each output indication from comparer 44 indicates the occurrence of an ectopic heart beat. If the outputs of comparers 44 and 86 are applied to counting circuitry within evaluation equipment 14, then that counting circuitry indicates the number of ectopic heart beats occurring during the time monitored and the total number of heart beats occurring during that same time.

Preferably, feedback resistors 64 and 106 are of considerably greater magnitude than are input resistors 42, 62, 84, and 104. Thus, for example, these input resistors might be in the order of 510 ohms, while feedback resistors 64 and 106 might be in the order of 24,000 ohms. As a result, minor voltage fluctuations in the EKG trace do not cause erroneous output indications. With these input and feedback resistance values, the comparers 44 and 86 have a hysteresis of 50 millivolts so that there must be a voltage drop of at least 50 mv. between input pulses in order to obtain distinct output counts from comparers 44 and 86.

If it is known that a particular patient's heart sometimes produces ectopic beats of the type in which the P wave is absent, and it is desired to obtain a count of the number of heart beats of that type which are contained in the EKG trace, then rheostats 90, 100, and 102 in the second channel are adjusted in the same manner as previously, so that comparer 86 provides an output indication for each heart beat, and rheostats 48, 58, and 60 are adjusted so that comparer 44 provides an output indication each time the EKG trace exceeds a value lower than the normal P wave and T wave amplitudes. Accordingly, comparer 44 provides an output indication for each P wave, R wave and T wave in the EKG trace. If no P waves or T waves be missing, the output of comparer 44 is three times as many counts as is the output of comparer 86. Should counts be missing from the comparer 44 output, then it is known that either P waves or T waves are absent from the EKG trace. Generally, a patient does not have a heart condition in which both P waves and T waves are missing, and visual analysis of a graphical EKG recording permits determination of which of these two low amplitude waves is likely to be missing.

When it is desired to detect ectopic heart beats of the type in which the S wave or the Q wave is missing, switch 40 is turned to its second position so that the signal applied to the positive input of comparer 44 is the inverted EKG trace. Rheostats 90, 100, and 102 remain in their previous settings to cause comparer 86 to provide an output indication for each heart beat. Rheostats 48, 58, and 60 are adjusted to cause an output indication from comparer 44 each time the signal applied to the positive input of that comparer exceeds a voltage level lower than the inverted Q wave and inverted S wave voltages. Comparer 44 thus provides an output indication for each Q wave and each S wave in the EKG trace. If the output of comparer 44 includes less than twice as many counts as does the output of comparer 86, then it is known that either Q waves or S waves are missing from the EKG trace. Again, visual analysis of the EKG trace permits determination of which of these ectopic heart conditions is to be expected in the patient under analysis.

Although some of the components depicted in FIG. 3, such as amplifier 76 and switch 82, could be omitted, and still the present invention would result, the several controls provided in the forms of rheostats 48, 58, 60, 90, 100, and 102 and switches 40 and 82 result in an extremely versatile apparatus capable of detecting a wide variety of types of ectopic heart beats. When the EKG trace is provided to the ectopic detector from a tape of that trace, then, during a first run of the tape, ectopic heart beats of a first type can be detected, for example of a type in which the R wave is of an extremely increased amplitude. During a second run of the tape, ectopic heart beats of another type can be detected, for example ectopic heart beats in which the S wave is absent.

The apparatus and method of the present invention thus permit rapid and accurate evaluation of EKG traces, enabling more thorough analysis of patients. This not only permits a determination of the condition of a patient, it also permits a determination of the effects of various types of treatment on that patient. Thus, for example, where it may not be possible from visual analysis of an EKG trace to determine the effects of a particular drug therapy upon a patient with a known heart condition, analysis of the EKG trace by means of the present invention greatly improves a determination of the drug effect.

Although the present invention has been described with reference to preferred embodiments, numerous modifications can be made, and still the resulting apparatus would be within the scope of the invention.

What is claimed is:

1. Apparatus for monitoring signal magnitudes within electrocardiac traces, each trace including at least one electrocardiac signal of the type normally having in sequence a P wave of a first relatively low positive magnitude, a Q wave of a second relatively low negative magnitude, an R wave of a third relatively high positive magnitude, an S wave of a fourth relatively low negative magnitude, and a T wave of a fifth relatively low positive magnitude, each of the waves having a normal signal magnitude, said apparatus comprising input means adapted to receive electrocardiac traces, first comparison means coupled to the input means for providing a first output indication upon application to the first comparison means of an electrocardiac trace wave having a signal magnitude exceeding the normal signal magnitude of a first selected one of the waves, and second comparison means coupled to the input means for providing a second output indication upon application to the second comparison means of an electrocardiac trace wave having a signal magnitude exceeding the normal signal magnitude of a second selected one of the waves.

2. Apparatus as claimed in claim 1 in which the input means includes attenuation means for attenuating signals of a frequency in excess of a normal heart beat rate.

3. Apparatus as claimed in claim 2 in which the attenuation means attenuates signals of a frequency in excess of about five times a normal heart beat rate.

4. Apparatus as claimed in claim 2 in which the input means comprises a first operational amplifier having a feedback circuit including a parallel resistor-capacitor combination.

5. Apparatus as claimed in claim 4 in which the first comparison means comprises a first comparison amplifier having a first input coupled to the output of the first operational amplifier and having a second input, and means for applying to the first comparison amplifier second input a first comparison signal having a signal magnitude exceeding the normal signal magnitude of the first selected one of the waves to cause the first comparison amplifier to provide a first output indication whenever a received electrocardiac trace exceeds the normal signal magnitude of the first selected one of the waves; and in which the second comparison means comprises a second comparison amplifier having a first input coupled to the output of the first operational amplifier and having a second input, and means for applying to the second comparison amplifier second input a second comparison signal having a signal magnitude exceeding the normal signal magnitude of the second selected one of the waves to cause the second comparison amplifier to provide a second output indication whenever a received electrocardiac trace exceeds the normal signal magnitude of the second selected one of the waves.

6. Apparatus as claimed in claim 5 further comprising first inversion means coupled to the output of the first operational amplifier and means for decoupling the first comparison amplifier first input from the output of the first operational amplifier and coupling the last named input to the output of the first inversion means.

7. Apparatus as claimed in claim 6 further comprising second inversion means coupled to the output of the first operational amplifier and means for decoupling the second comparison amplifier first input from the output of the first operational amplifier and coupling the last named input to the output of the second inversion means.

8. Apparatus as claimed in claim 7 further comprising a source of electrocardiac signals connected to said input means.

9. Apparatus as claimed in claim 8 further comprising means coupled to said first and second comparison means for evaluating said first and second output indications.

10. A method of evaluating an electrocardiac trace including at least one electrocardiac signal of the type normally having in sequence and with respect to a reference magnitude a P wave of a first relatively low positive magnitude, a Q wave of a second relatively low negative magnitude, an R wave of a third relatively high positive magnitude, an S wave of a fourth relatvely low negative magnitude, and a T wave of a fifth relatively low positive magnitude, each of the waves having a normal signal magnitude, said method comprising obtaining an electrocardiac trace, obtaining a first comparison level signal greater than the normal signal magnitude of a first selected one of the waves, obtaining a second comparison level signal greater than the normal signal magnitude of a second selected one of the waves, different from the first selected one of the waves, comparing the trace with the first comparison level signal, simultaneously comparing the trace with the second comparison level signal, generating a first output indication when the trace exceeds the first comparison level signal, generating a second output indication when the trace exceeds the second comparison level signal, and counting the first output indications and the second output indications.

11. A method as claimed in claim 10 in which the first comparison level signal is greater than the normal signal magnitude of the R wave.

12. A method as claimed in claim 10 in which the first comparison level signal is greater than the normal signal magnitudes of the P wave and the T wave and less than the normal signal magnitude of the R wave.

13. A method as claimed in claim 12 in which the second comparison level signal is greater than the normal signal magnitude of the R wave.

14. A method as claimed in claim 12 further comprising inverting the trace before comparing the trace with the second comparison level signal.

References Cited

UNITED STATES PATENTS

| | | | |
|---|---|---|---|
| 3,229,687 | 1/1966 | Holter et al. | 128—2.06 |
| 3,267,934 | 8/1966 | Thornton | 128—2.06 |
| 3,278,854 | 10/1966 | Liu | 330—109X |
| 3,352,300 | 11/1967 | Rose | 128—2.06 |

OTHER REFERENCES

Welling: "Electronics," Feb. 3, 1969, pp. 82–90.

WILLIAM E. KAMM, Primary Examiner